United States Patent [19]
Nishi et al.

[11] Patent Number: 5,580,934
[45] Date of Patent: Dec. 3, 1996

[54] RING-OPENING HYDROGENATED COPOLYMER AND PROCESS FOR PRODUCING THE SAME

[75] Inventors: Yoshikatsu Nishi, Yokohama; Masayoshi Oshima, Niiza; Teiji Kohara, Kawasaki; Tadao Natsuume, Yokosuka, all of Japan

[73] Assignee: Nippon Zeon Co., Ltd., Tokyo, Japan

[21] Appl. No.: 476,489

[22] PCT Filed: Dec. 26, 1988

[86] PCT No.: PCT/JP88/01331

§ 371 Date: Jun. 7, 1990

§ 102(e) Date: Jun. 7, 1990

[87] PCT Pub. No.: WO89/06254

PCT Pub. Date: Jul. 13, 1989

[30] Foreign Application Priority Data

Dec. 28, 1987 [JP] Japan .................. 62-329540
Dec. 28, 1987 [JP] Japan .................. 62-329541

[51] Int. Cl.$^6$ .................. C08F 232/08; C08F 8/04
[52] U.S. Cl. .................. 525/332.1; 525/338; 526/281
[58] Field of Search .................. 525/332.1, 338

[56] References Cited

FOREIGN PATENT DOCUMENTS

| | | | |
|---|---|---|---|
| 0303246 | 2/1989 | European Pat. Off. | C08G 61/08 |
| 0317262 | 5/1989 | European Pat. Off. | |
| 46-14910 | 4/1971 | Japan . | |
| 63-264626 | 11/1988 | Japan . | |

OTHER PUBLICATIONS

WPIL, File supplier, accession No. 89-210066, Derwent Publications, Ltd. London, GB: & JP-A-1 146 923.

*Primary Examiner*—Joseph L. Schofer
*Assistant Examiner*—Wu C. Cheng
*Attorney, Agent, or Firm*—Armstrong, Westerman, Hattori, McLeland & Naughton

[57] ABSTRACT

There are disclosed a polycyclic norbornene or its derivative hydrogenated copolymer which contains a repeating unit represented by the following formula [I] or the alkyl-substituted derivative thereof (A), a repeating unit represented by the following formula [II] or the alkyl-substituted derivative thereof (B) and, as desired, 5–85% by mole of at least one repeating unit (C) selected from a repeating unit represented by the following formula [III], the alkyl-substituted derivative thereof, a repeating unit represented by the following formula [IV], the alkyl-substituted derivative and the alkylidene-substituted derivative thereof, and a process for producing the polycyclic norbornene or its derivative ring-opening hydrogenated copolymer

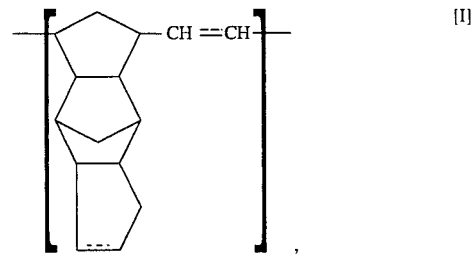

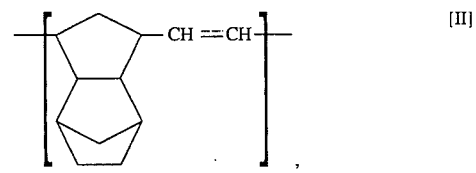

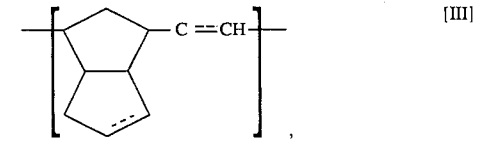

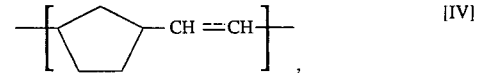

wherein ——— represents either a single bond or a double bond.

23 Claims, No Drawings

RING-OPENING HYDROGENATED COPOLYMER AND PROCESS FOR PRODUCING THE SAME

TECHNICAL FIELD

The present invention relates to a novel ring-opening hydrogenated copolymer excellent in thermal resistance, optical property and moldability. In more particular, it relates to a polycyclic norbornene or its derivative ring-opening hydrogenated copolymer which is excellent in thermal resistance and gives moldings with little optical strain, and a process for producing the same.

BACKGROUND ART

Polymers hitherto mainly used as optical materials are polymethyl methacrylate and polycarbonate. However, the former has a problem of rather high water absorption and the latter has a problem of development of birefringence in injection molding. Accordingly, it is becoming difficult for these polymers to meet recent requirements, which are becoming increasingly more severe.

In recent years, polymers which use polycyclic norbornene or allied monomers have been developed as polymeric materials improved in said properties in question. For example, Japanese Patent Application Kokai (Laid-open) No. 60-26024 describes that the hydrogenation products of ring-opening polymers of tetracyclodecenes or of ring-opening copolymers of tetracyclododecenes and norbornenes are excellent in transparency, water resistance and thermal resistance. However, the hydrogenation products of ring-opening polymers of tetracyclododecenes are not fully satisfactory in moldability and their birefringence values are not so small as can meet the property requirement sufficiently. The hydrogenation products of ring-opening copolymers of tetracyclododecenes and norbornenes also have similar problems. Although hydrogenation products of this kind having a high proportion of norbornenes in copolymerization of 40–50% by mole are somewhat improved in said properties, they have a low glass transition temperature (Tg) of 95°–105° C. and hence their thermal resistance is not fully satisfactory.

Japanese Patent Application Kokoku (Post-Exam. Publn.) No. 58-43412 describes that the hydrogenation product of dicyclopentadiene ring-opening polymer can be easily heat-melt processed to give a tough, transparent sheet. The hydrogenation product, however, is unsatisfactory in thermal resistance for use as optical disks because it has a low glass transition temperature (Tg) of about 95° C.

On the other hand, polymers obtained by using polycyclic norbornene or allied monomers, when they have not been hydrogenated, are poor in resistance to oxidative degradation and hence unsuitable for use as optical materials.

DISCLOSURE OF THE INVENTION

An object of the present invention is to provide a novel polymeric material which is excellent in thermal resistance, optical property and moldability.

Another object of the present invention is to provide a polycyclic norbornene or its derivative ring-opening hydrogenated copolymer which has a high glass transition temperature and gives moldings with little optical strain.

The present inventors have made extensive study to develop a novel synthetic resin suitable as optical polymer or as the raw material thereof by using polycyclic norbornene or allied monomers. As the result it has been found out that the hydrogenation products of ring-opening copolymers obtainable by ring-opening copolymerization of (A) pentacyclopentadecadienes and/or pentacyclopentadecenes, (B) tetracyclododecenes and, as desired, (C) as least one monomer selected from dicyclopentadienes, dihydrodicyclopentadienes and norbornenes are excellent in thermal property and moldability and give moldings with little of optical strain. The present invention has been accomplished on the basis of above finding.

BEST MODE FOR CARRYING OUT THE INVENTION

The first aspect of the present invention relates to a polycyclic norbornene or its derivative ring-opening hydrogenated copolymer which contains (A) 70–10% by mole of a repeating unit represented by the following formula [I] or the alkyl-substituted derivative thereof, and (B) 30–90% by mole of a repeating unit represented by the following formula [II] or the alkyl-substituted derivative thereof, has an intrinsic viscosity [η] of 0.01–20 dl/g as determined in toluene at 25° C., and in which at least 50% of the (C———C) linkages constituting the main chain are single bonds

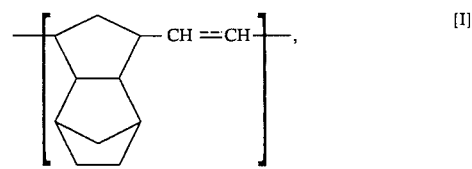

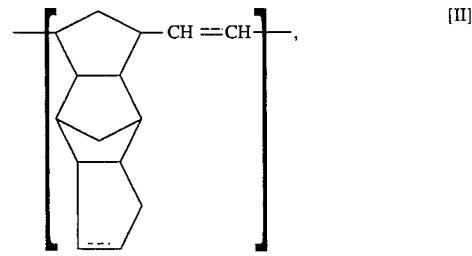

wherein ——— represents either a single bond or a double bond.

The second aspect of the present invention relates to a polycyclic norbornene or its derivative hydrogenated copolymer which contains (A) preferably 85–5% by mole of a repeating unit represented by the following formula [I] or the alkyl-substituted derivative thereof.

(B) preferably 10–90% by mole of a repeating unit represented by the following formula [II] or the alkyl-substituted derivative thereof, and (C) preferably 5–85% by mole of at least one repeating unit selected from a repeating unit represented by the following formula [III], the alkyl-substituted derivative thereof, a repeating unit represented by the following formula [IV], the alkyl-substituted derivative thereof or the alkylidene-substituted derivative thereof, has an intrinsic viscosity [η] of 0.01–20 dl/g as determined in toluene at 25° C., and in which at least 50% of the (C———C) linkages constituting the main chain are single bonds

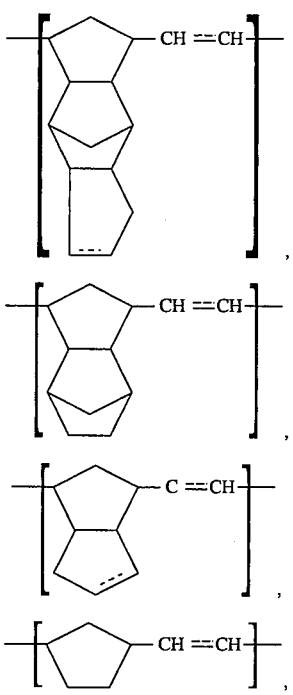

[I]

[II]

[III]

[IV]

wherein ══ represents either a single bond or a double bond.

The third aspect of the present invention relates to a process for producing a polycyclic norbornene or its derivative hydrogenated copolymer wherein at least 50% of the (C══C) linkages constituting the main chain are single bonds which is characterized by hydrogenating with hydrogen and by use of a hydrogenation catalyst a part or the whole of the olefinic unsaturated groups contained in a polycyclic norbornene or its derivative ring-opening copolymer which contains (A) preferably 70–10% by mole of a repeating unit represented by the following formula [I] or the alkyl-substituted derivative thereof and (B) preferably 30–90% by mole of a repeating unit represented by the following formula [II'] or the alkyl-substituted derivative thereof, and has an intrinsic viscosity [η] of 0.01–20 dl/g as determined in toluene at 25° C.

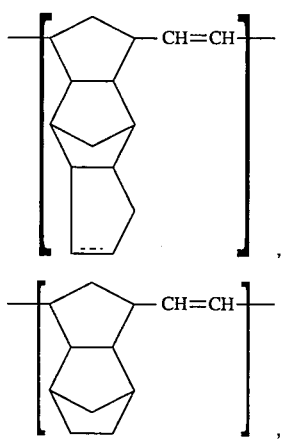

[I']

[II']

wherein ══ represents either a single bond or a double bond.

The fourth aspect of the present invention relates to a process for producing a polycyclic norbornene or its derivative ring-opening hydrogenated copolymer wherein at least 50% of the (C══C) linkages constituting the main chain are single bonds which is characterized by hydrogenating with hydrogen and by use of a hydrogenation catalyst a part or the whole of the olefinic unsaturated groups contained in a polycyclic norbornene or its derivative ring-opening copolymer which contains (A) preferably 85–5% by mole of a repeating unit represented by the following formula [I'] or the alkyl-substituted derivative thereof, (B) preferably 10–90% by mole of a repeating unit represented by the following formula [II'] or the alkyl-substituted derivative thereof, and (C) preferably 5–85% by mole of at least one repeating unit selected from a repeating unit represented by the following formula [III°], the alkyl-substituted derivative thereof, a repeating unit represented by the following formula [IV'], the alkyl-substituted derivative thereof or the alkylidene-substituted derivative thereof, and has an intrinsic viscosity [η] of 0.01–20 dl/g as determined in toluene at 25° C.

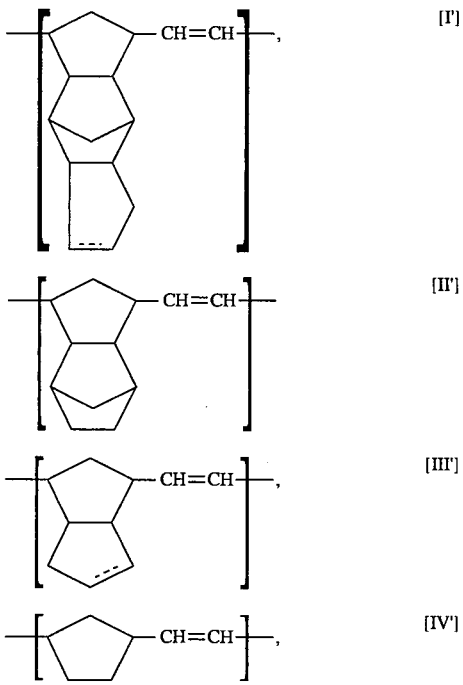

[I']

[II']

[III']

[IV']

wherein ══ represents either a single bond or a double bond.

The ring-opening copolymer used in the present invention employs as the component monomer (A), among polycyclic norbornene and allied compounds, particularly 4,9,5,8-dimethano-3a,4,4a,5,8,8a,9,9a-octahydro-1H-benzoindene (namely, pentacyclopentadecadiene), 4,9,5,8-dimethano-2,3,3a,4,4a,5,8,8a,9,9a-decahydro-1H-benzoindene (namely, pentacyclopentadecene) or the alkyl-substituted derivatives thereof (hereinafter sometimes referred to as "component A") and, as the component comonomer, (B) tetracyclododecenes, namely tetracyclododecene and the alkyl-substituted derivatives thereof (hereinafter sometimes referred to as "component B") and, as required, (C) at least one monomer selected from 4,7-methano-3a,4,7,7a-tetrahydro-1H-indene (namely dicyclopentadiene), 4,7-methano-2,3,3a,4,7,7a-hexahydroindene (namely, dihydrodicyclopentadiene), the alkyl-substituted derivatives thereof, and unsubstituted or substituted norbornene (hereinafter sometimes referred to as "component C"), and can be prepared by known methods of ring-opening polymerization of cyclic olefins. The hydrogenation products of these ring-opening copolymers can be produced by using conventional methods of hydrogenation.

The respective constituents of the present invention will be described in detail below.

Monomer

The component A used in the present invention is selected from the following two kinds of monomers. The first monomer is pentacyclopentadecadiene (4,9,5,8-dimethano-3a,4,4a,5,8,8a,9,9a-octahydro-1H-benzoindene) represented by the following formula [V] (said monomer being hereinafter abbreviated as "PCDE").

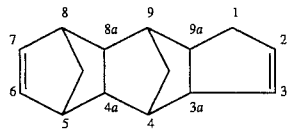

Said PCDE may be obtained by subjecting cyclopentadiene to a Dieis-Alder reaction with dicyclopentadiene, followed by separation from the reaction mixture by such means as distillation.

The other monomer of the components A is pentacyclopentadecene (4,9,5,8-dimethano-2,3,3a,4,4a,5,8,8a,9,9a-decahydro-1H-benzoindene) represented by the following formula [VI] (hereinafter abbreviated as "PCPD").

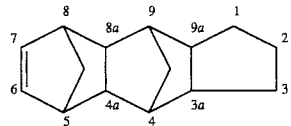

This compound may be prepared by subjecting cyclopentene to a Dieis-Alder reaction with cyclopentadiene and then again subjecting the reaction product to a Dieis-Alder reaction with cyclopentadiene.

The PCDE and the PCPD mentioned above may be used either each alone or as a mixture of desired proportion.

The PCDE and the PCPD may be respectively the derivative thereof substituted with alkyl such as methyl, derivative thereof substituted with alkyl such as methyl, ethyl and propyl.

The components B used in the present invention are tetracyclododecene (hereinafter sometimes abbreviated as "TCD") represented by the following formula [VII] or the alkyl-substituted derivative thereof.

Said TCDs may be obtained by subjecting cyclopentadienes to a Dieis-Alder reaction with norbornenes, followed by separation from the reaction mixture by such means as distillation.

The TCDs may be also the derivatives substituted with lower alkyl such as methyl, ethyl and propyl. The alkyl substituent may be present also in plurality.

The components C used in the present invention are dicyclopentadiene (hereinafter sometimes abbreviated as "DCP"), 2,3-dihydrodicyclopentadiene (4,7-methano-2,3, 3a,4,7,7a-hexahydroindene, hereinafter sometimes abbreviated as "HDCP"), the derivatives thereof substituted with alkyl such as methyl, ethyl, propyl and butyl, or unsubstituted or substituted norbornene (hereinafter sometimes abbreviated as "NB"). These may be used each alone or as suitable mixtures thereof.

Examples of substituted norbornenes are alkyl-substituted norbornenes such as 5-methyl-2-norbornene, 5,6-dimethyl-2-norbornene, 5-ethyl-2-norbornene and 5-butyl-2-norbornene or alkylidene-substituted norbornenes such as ethylidenenorbornene.

In the first and the third aspects of the present invention, the component A mentioned above is used in a proportion of preferably 70–10% by mole, more preferably 60–20% by mole, and the component B in a proportion of preferably 30–90% by mole, more preferably 40–80% by mole.

In the second and the fourth aspects of the present invention the component A is used in a proportion of preferably 85–5% by mole, more preferably 70–10% by mole, the component B in a proportion of preferably 10–90% by mole, more preferably 20–80% by mole, and the component C in a proportion of preferably 5–85% by mole, more preferably 10–70% by mole.

The use of the component A makes it possible to obtain a product which can give moldings with little optical strain even in the region of higher glass transition temperature as compared with the hydrogenation product of ring-opening copolymers of tetracyclododecenes (component B) with norbornenes (component C) known to the art. As the proportion of the component A used increases, the glass transition temperature rises. Too high a glass transition temperature is undesirable because it makes processing of the resin difficult. When the component A is not used, the glass transition temperature of the resulting polymer does not become sufficiently high and, particularly when the polymer is hydrogenated for the purpose of improving resistance to thermal degradation and photo-degradation, the glass transition temperature decreases greatly as compared with that of the original polymer, which is a problem in practical use.

With the increase in the proportion of the component B used, so rises the glass transition temperature. However, too high a glass transition temperature makes processing of the resin difficult and also leads to the increase of birefringence refraction, an important optical characteristic. Conversely, when the proportion of the component C is large, the glass transition temperature is not sufficiently high and the reduction in birefringence attainable is not so marked considering the unsatisfactory glass transition temperature.

In the present invention, besides the components A and B or the components A, B and C mentioned above, other cycloolefins capable of ring-opening polymerization may be used within the range not substantially deleterious to the effect of the present invention. Specific examples of cycloolefins which may be used are compounds having one reactive double bond, such as cyclopentene, cyclooctene, and 5,6-dihydrodicyclopentadiene.

Polycyclic norbornene or allied monomers contain as impurities compounds having two or more double bonds. Such compounds are preferably removed as completely as possible since they are apt to cause gelation of the polymer.

The monomer mixture used in the present may be prepared by mixing the respective components prepared in advance. Alternately, it may be synthesized directly by heat-treating DCPs with norbornenes, or by heat-treating DCPs with norbornenes in the presence of cyclopentene. The heat treatment may be effectuated by heating DCPs with norbornenes, or heating these monomers with cyclopentene, in an atmosphere of inert gas such as nitrogen gas at a temperature of 120°–250° C., preferably 150°–230° C. for 0.5–20 hours, preferably 1–10 hours. The treatment reaction may be conducted either batch-wise or continuously. An inert solvent may also be present in the reaction system.

Further, besides the components A and B or the components A, B and C, there may be added chain mono-olefins and chain non-conjugated diolefins, such as butene-1, pentene-1, hexene-1, octene-1, butene-2, pentene-2, and 1,4-hexadiene, within the range of up to about 10% by mole for molecular weight control.

Polymerization Catalyst

The ring-opening copolymer of these monomers are prepared by conventional methods used for polymerization of norbornenes. As polymerization catalysts usable herein, there may be mentioned, for example, compounds of platinum group metals such as ruthenium, rhodium, palladium, osmium, iridium, and platinum (for example, Japanese Patent Application Kokoku No. 46-14910) or systems comprising compounds of transition metals, such as titanium, vanadium, molybdenum and tungsten, and organometallic compounds of metals of the groups I–IV of the periodic table. Said catalytic systems may be used also in combination with a third component such as tertiary amines, etc. (for example, Japanese Patent Application Kokoku Nos. 41-20111, 57-17883, and 57-61044 and Japanese Patent Application Kokai Nos. 54-86600 and 58-127728).

The polymerization catalyst is not particularly restricted so long as it is a metallic compound capable of effecting ring-opening polymerization of the monomers mentioned above. Preferred are, however, catalytic systems comprising transition metal compounds such as titanium tetrahalides and organometals such as organo-aluminum compounds, or catalytic systems comprising said systems and a third component such as aliphatic or aromatic tertiary amines incorporated thereinto.

Specific examples of the polymerization catalyst will be described below.

Transition Metal Compound

Preferred metal compounds are those of transition metals such as titanium, vanadium, tungsten and molybdenum. More specifically, there may be cited the halides, oxyhalides, oxides, carbonyl compounds and organic ammonium salts of these transition metals.

As specific examples, there may be mentioned $TiCl_4$, $TiBr_4$, $VOCl_3$, $VOBr_3$, $WBr_2$, $WBr_4$, $WBr_6$, $WCl_2$, $WCl_4$, $WCl_5$, $WCl_6$, $WF_4$, $WI_2$, $WI_4$, $WOBr_4$, $WOCl_4$, $WOF_4$, $MoBr_2$, $MoBr_3$, $MoBr_4$, $MoCl_4$, $MoCl_5$, $MoF_4$, $MoOCl_4$, $MoOF_4$, $WO_2$, $H_2WO_4$, $Na_2WO_4$, $K_2WO_4$, $(NH_4)_2WO_4$, $CaWO_4$, $CuWO_4$, $MgWO_4$, $(CO)_5WC(OCH_3)(CH_3)$, $(CO)_5WC(OC_2H_5)(CH_3)$, $(CO)_5WC(OC_2H_5)(C_2H_5)$, $(CO)_5MoC(OC_2H_5)(CH_3)$, $(CO)_5Mo=C(OC_2H_5)(N(C_2H_5)_2)$, tridecylammonium molybdate, tridecylammonium tungstate, etc.

Organometallic Compound

Organometallic compounds which may be used include those of the groups I–IV of the periodic table, for example, organoaluminum compounds, organotin compounds, or compounds of lithium, sodium, magnesium, zinc, cadmium, boron, etc.

Specific examples of the organoaluminum compound include trimethylaluminum, triethylaluminum, tri-n-propylaluminum, triisopropylaluminum, triisobutylaluminum, trihexylaluminum, trioctylaluminum, triphenylaluminum, tribenzylaluminum, diethylaluminum monochloride, di-n-propylaluminum monochloride, diisobutylaluminum monochloride, di-n-butylaluminum monochloride, diethylaluminum monobromide, diethylaluminum monoiodide, diethylaluminum monohydride, di-n-propylaluminum monohydride, diisobutylaluminum monohydride, methylaluminum sesquichloride, ethylaluminum sesquibromide, isobutylaluminum sesquichloride, ethylaluminum dichloride, ethylaluminum dibromide, propylaluminum dichloride, isobutylaluminum dichloride, ethylaluminum dibromide, and ethylaluminum diiodide.

Specific examples of the organotin compound include tetramethyltin, diethyldimethyltin, tetraethyltin, dibutyldiethyltin, tetrabutyltin, tetraisocumyltin, tetraphenyltin, triethyltin fluoride, triethyltin chloride, triethyltin bromide, triethyltin iodide, diethyltin difluoride, diethyltin dichloride, diethyltin dibromide, diethyltin diiodide, ethyltin trifluoride, ethyltin trichloride, ethyltin tribromide, and ethyltin triiodide. As other examples, mention may be made of n-butyllithium, n-pentylsodium, methylmagnesium iodide, ethylmagnesium bromide, methylmagnesium bromide, n-propylmagnesium chloride, t-butylmagnesium chloride, allylmagnesium chloride, diethylzinc, diethylcadmium, trimethylboron, triethylboron and tri-n-butylboron.

Third Component

A third component may be added to the catalytic system mentioned above to enhance the polymerization activity and improve the selectivity in ring-opening polymerization. As specific examples, mention may be made of molecular oxygen, alcohols, ethers, peroxides, carboxylic acids, acid anhydrides, acid chloride, esters, ketones, nitrogen-containing compounds, sulfur-containing compounds, halogen-containing compounds, molecular iodine, and further Lewis acids, etc. Particularly preferred among them are aliphatic or aromatic tertiary amines, specific examples of which include triethylamine, dimethylaniline, tri-n-butylamine, pyridine and α-picoline.

Solvent

The polymerization of the ring-opening copolymer used in the present invention may be carried out without using a solvent, but it can be conducted also in an inert organic solvent.

Specific examples of the solvent include aromatic hydrocarbons such as benzene, toluene and xylene, aliphatic hydrocarbons such as n-pentane, hexane and heptane, alicyclic hydrocarbons such as cyclohexane, halogenated hydrocarbons such as methylene dichloride, dichloroethane, dichloroethylene, tetrachloroethane, chlorobenzene, dichlorobenzene, and trichlorobenzene, etc. These solvent may be used also as a mixture of two or more thereof.

Polymerization Temperature

Though the temperature of the ring-opening copolyemrization is not critical, it is usually selected as desired from the range of –20° C. to 100° C.

Polymerization Pressure

The polymerization pressure is preferably selected usually from the range of 0–50 kg/cm.

Hydrogenation

The ring-opening hydrogenated copolymer of the present invention can be obtained by hydrogenating the ring-opening copolymer mentioned above to saturated a part or the whole of its olefinic unsaturated groups (i.e., the double bonds of the main chain and the double bonds of the unsaturated ring), whereby the resistance to thermal degradation and the resistance to photo-degradation of the polymer can be improved further. The hydrogenation rate ranges theoretically from 0–100%, the case wherein all of the double bonds of the ring-opening polymer have been saturated by hydrogenation being taken as 100%, and can actually be selected as desired in said range. To enhance the resistance to thermal degradation and the resistance to photo-degradation, however, at least 50% of the main chain double bonds should be hydrogenated.

The hydrogenation of the ring-opening copolymer is conducted by conventional methods. The hydrogenation catalysts which can be used may be those generally used in hydrogenation of olefinic compounds and are not particularly restricted. Examples thereof are as follows. As examples of heterogeneous catalysts, there may be mentioned nickel, palladium, and platinum or solid catalysts comprising these metals supported on a carrier such as carbon, silica, diatomaceous earth, alumina and titanium oxide, e.g., nickel/silica, nickel/diatomaceous earth, palladium/carbon, palladium/silica, palladium diatomaceous earth and palladium/alumina. As examples of homogeneous catalysts, there may be mentioned those based on metals of the group VIII of the periodic table, for example those comprising a Ni or Co compound and an organometallic compound of metals of the groups I–III of the periodic table, such as nickel naphthenate/triethylaluminum, cobalt octenoate/n-butyllithium and nickel acetylacetonate/triethylaluminum, or Rh compounds.

The hydrogenation is conducted either in a homogeneous system or in a heterogeneous system according to the kind of catalyst. Though the conditions for hydrogenation may vary depending on the kind of catalyst, it is usually conducted under a hydrogen pressure of about 1–150 atm usually at 0°–250° C., preferably at 20°–180° C. Although the rate of hydrogenation may be controlled as desired by varying the hydrogen pressure, reaction temperature, reaction time, catalyst concentration etc., it is necessary for obtaining hydrogenation products exhibiting excellent resistance to thermal degradation and resistance to photo-degradation to hydrogenate at least 50%, preferably at least 80%, more preferably at least 90%, of the main chain double bonds in the polymer.

Ring-Opening Hydrogenated Copolymer

The ring-opening copolymer used in the present invention has an intrinsic viscosity [η] determined in toluene at 25° C. of 0.01–20 dl/g, preferably 0.1–10 dl/g. Similarly, the ring-opening hydrogenated copolymer of the present invention has a [η] of 0.01–20 dl/g, preferably 1 0.1–10 dl/g. The hydrogenation products, having a [η] in said range, have good thermal resistance, water resistance, transparency, chemical resistance, solvent resistance, processability and mechanical properties.

Ring-opening hydrogenated polymer products obtained by hydrogenation of ring-opening copolymers of TCDs with NBs have a relatively high glass transition temperature and excellent thermal resistance but, on the other hand, have a problem of rather unsatisfactory birefringence value. As contrasted thereto, in the ring-opening hydrogenated copolymer of the present invention, the glass transition temperature of the polymer can be controlled appropriately to obtain a good balance between thermal resistance and processability and, at the same time, moldings with little of optical strain can be obtained even in the region of high glass transition temperatures, by copolymerizing in specified ratios the component A (PCDEs, PCPDs), the component B (TCDs) and, as desired, the component C (DCPs, HDCPs, NBs).

More specifically, the glass transition temperature (Tg) of the hydrogenation products of the present invention can De controlled as desired in the range of about 110° C.–about 190° C., preferably 170° C.–180° C. in the first aspect and 120° C.–160° C. in the second aspect.

As is apparent from the measured value of bending strength in particular, the hydrogenation products according to the first aspect of the present invention have a mechanical strength equal to or higher than that of the ring-opening hydrogenated polymers of TCDs.

As is apparent from the birefringence value, moldings with little of optical strain can be obtained even in the region of high Tgs.

Moreover, the hydrogenation products exhibit excellent balance among light transmission, water resistance, chemical resistance, solvent resistance and mechanical strength. Accordingly, they are suitable particularly as optical materials.

Further, the ring-opening hydrogenated polymers of the present invention have a still more improved resistance to thermal degradation and resistance to photo-degradation as compared with the ring-opening copolymer used therefor.

Processing

The ring-opening hydrogenated copolymer of the present invention can be processed by known methods. Various additives may be added thereto in processing, including inorganic and organic fillers, stabilizers, antistatic agents, lubricants, etc.

Uses

The ring-opening hydrogenated copolymer of the present invention has a high glass transition temperature and, as is apparent from the fact that the unsaturated groups in the original copolymer have been hydrogenated, are excellent in resistance to thermal degradation and photo-degradation and in optical properties and well-balanced among transparency, water resistance, chemical resistance and mechanical properties, so that it is useful in a wide field as various formed articles.

Thus, it can be used in a variety of fields including, for example, optical fields, e.g., for optical lenses, optical disks, optical fibers, pellicles and glass windows; electric field, e.g., for water tanks of electric irons, electronic oven parts, substrates, for liquid crystal display, printed boards circuit boards for high frequency waves, and transparent electroconductive sheets and film; medical and related fields, e.g., for injectors, pipets and animal cages; and further for camera bodies, housings of various measuring instruments, films, sheets and helmets.

EXAMPLE

The present invention will be described in more detail below with reference to Examples and Comparative Examples, but it is in no way limited to these Examples. In the following description, "part" means "part by weight" unless otherwise specified.

Example 1

In a reactor thoroughly dried and purged with nitrogen, were placed 40 parts of pentacyclopentadecadiene (PCDE), 60 parts of tetracyclododecene (TCD), 1% by mole of 1-hexane relative to the total amount (100 parts) of monomers, and 300 parts of toluene. Then 16 parts of 1 molar concentration toluene solution of triethylaluminum, 4 parts of triethylamine and 3 parts of 1 molar concentration toluene solution of titanium tetrachloride were added thereto and the resulting mixture was allowed to react at 25° C. for 2 hours.

The reaction solution was poured into an acetone/isopropyl alcohol (volume ratio: 1/1, the same applies hereinafter) mixture to coagulate the polymer, and then the precipitate was separated by filtration and dried to obtain 62 parts of polymer. The yield was 62%.

Analysis of the polymer obtained above by proton NMR spectrometry gave a molar ratio of the PCDE component to the TCD component in the polymer of 34:66. The intrinsic viscosity determined in toluene at 25° C. was 0.67 dl/g.

Separately, 50 parts of the above polymer was dissolved in 450 parts of cyclohexane and subjected to hydrogenation using 5 parts of palladium-carbon catalyst at a hydrogen pressure of 80 kg/cm$^2$ and a temperature of 140° C. for 4 hours. The polymer solution thus obtained was filtered to remove the catalyst, then poured into an acetone/isopropyl alcohol (1/1) mixture to effect coagulation, and the precipitate was filtered and dried to obtain 40 parts of a polymer.

Analysis of the polymer by $^1$H-NMR spectrometry showed that the absorption of proton due to double bond has disappeared. Thus it was confirmed that the polymer had been hydrogenated nearly completely (namely, hydrogenation rate: 100%).

The intrinsic viscosity of the hydrogenated polymer was 0.66 dl/g as determined in toluene at 25° C. The glass transition temperature of the hydrogenated polymer determined by DSC analysis was 174° C.

The hydrogenated polymer was compression-molded at 230° C. to prepare plates 10 cm in diameter and 2 mm in thickness. The molded plate was tough and had a bending strength (determined according to ASTM D790) of 810 kg/cm$^2$. The moisture absorption after immersion in water at 25° C. for 24 hours was 0.1% or less.

The above results reveal that the ring-opening copolymer hydrogenation product of the present invention is excellent in thermal resistance and mechanical properties and further is satisfactory in other properties including water resistance.

Examples 2–4

Ring-opening copolymerization, hydrogenation and compression molding were conducted in the same manner as in Example 1 except that the monomer composition was altered to the compositions shown in Table 1 (Experiment Nos. 2–4).

The polymers and the compression-molded plates obtained were subjected to determination of properties in the same manner as in Example 1. The properties thus determined are shown in Table 1. The results of Example 1 (Experiment No. 1) are also shown in the Table.

Comparative Examples 1–2

For comparison, polymers and plates were obtained and their properties were determined in the same manner as in Example 1 except for using as the monomer PCDE alone or TCD alone. The results thus obtained are shown in Table 1.

As is apparent from Table 1, the ring-opening hydrogenated copolymer of the present invention has a high Tg of 170°–180° C. and yet has a bending strength in a favorable range of 750–810 (kg/cm$^2$).

Also it has a high water resistance and transparency, and thus is a polymer with well-balanced properties.

TABLE 1

|  | Example | | | | Comp. Example | |
| --- | --- | --- | --- | --- | --- | --- |
| Experiment No. | 1 | 2 | 3 | 4 | 1 | 2 |
| PCDE (wt %) | 40 | 30 | 50 | 60 | 100 | 0 |
| TCD (wt %) | 60 | 70 | 50 | 40 | 0 | 100 |
| Polymer yield (wt %) | 62 | 70 | 63 | 57 | 52 | 63 |
| Intrinsic viscosity [η] (dl/g) | 0.67 | 0.62 | 0.68 | 0.72 | 0.70 | 0.64 |
| PCDE or PCPD repeating unit content in polymer (mol %) | 34 | 26 | 44 | 54 | 100 | 0 |
| TCD repeating unit content in polymer (mol %) | 66 | 74 | 56 | 46 | 0 | 100 |
| Hydrogenation rate (%) | 100 | 100 | 100 | 100 | 100 | 100 |
| Intrinsic viscosity [η] (dl/g) | 0.60 | 0.66 | 0.66 | 0.72 | 0.71 | 0.62 |
| Glass transition temperature Tg (°C.) | 174 | 170 | 178 | 180 | 195 | 163 |
| Bending strenght (kg/cm$^2$) | 810 | 780 | 810 | 750 | 490 | 770 |
| Light transmittance (%) (2 mm thick disk, determined at 830 nm) | 84 | 85 | 84 | 84 | 83 | 84 |
| Moisture absorption (wt %) (JIS 6911) | <0.1 | <0.1 | <0.1 | <0.1 | <0.1 | <0.1 |
| Solvent resistance (20 hours, room temp.) | | | | | | |
| Ethyl acetate | o | o | o | o | o | o |
| Acetone | o | o | o | o | o | o |

TABLE 1-continued

|  | Example | | | | Comp. Example | |
| --- | --- | --- | --- | --- | --- | --- |
| Experiment No. | 1 | 2 | 3 | 4 | 1 | 2 |
| Chemical resistance (20 hours, room temp.) | | | | | | |
| 28% aq. ammonia | o | o | o | o | o | o |
| 97.6% Sulfuric Acid | o | o | o | o | o | o |

Note: The symbol o in the table indicates that no change occurred in appearance.

Example 5

A polymer was synthesized in the same manner as in Example 1 except that 20 parts of pentacyclopentadecadiene (PCDE), 35 parts of tetracyclododecene (TCD) and 45 parts of dicyclopentadiene (DCP) were used. The yield was 70%.

Calculation based on the result of the proton NMR spectrometric analysis of the polymer obtained above and the gas chromatographic analysis of the amount of unreacted monomers after polymerization revealed that the molar ratio of the respective components in the polymer originating from the PCDE component, TCD component and DCP component were 16:33:51. The intrinsic viscosity determined in toluene at 25° C. was 0.61 dl/g.

Separately, 50 parts of the above polymer was subjected to hydrogenation in the same manner as in Example 1. The polymer solution thus obtained was filtered to remove the catalyst, then poured into an acetone/isopropyl alcohol (1/1) mixture to effect coagulation, and the precipitate was collected by filtration and dried to obtain 41 parts of a polymer.

Analysis of the polymer by proton NMR spectrometry showed that the absorption of proton due to double bond had disappeared. Thus it was confirmed that the polymer had been hydrogenated nearly completely (hydrogenation rate: 100%).

The intrinsic viscosity of the hydrogenated polymer was 0.59 dl/g as determined in toluene at 25° C. The glass transition temperature of the hydrogenated polymer determined by DSC analysis was 133° C.

The hydrogenated polymer was injection-molded at 350° C. to prepare optical disk plattes ($\phi$ 13 cm, thickness 1.2 mm) and the light transmittance, birefringence value and moisture absorption were determined. It was found that the light transmittance was 90%, the double refraction value (inner periphery-outer periphery of the optical disk plate) was 10–40 nm and the moisture absorption was 0.1% or less.

Solvent resistance and chemical resistance were also observed in the same manner. No change in appearance was observed in both of the tests.

The results thus obtained are shown in Table 2. As is apparent from Table 2, it can be seen that the ring-opening copolymer hydrogenation product of the present invention is excellent in thermal resistance and optical properties and further is satisfactory in other properties including water resistance and solvent resistance.

Examples 6–10

Ring-opening copolymerization, hydrogenation and injection molding were conducted in the same manner as in Example 5 except that the monomer composition was altered to the compositions shown in Table 2.

The polymers and the optical disk plates thus obtained were subjected to determination of properties in the same manner as in Example 5. The results are shown in Table 2.

Comparative Examples 3–5

For comparison, polymers and optical disk plates were obtained and their properties were determined in the same manner as in Example 5 except for using as the monomer(s) TCD alone, DCP alone, or TCD and NB. The results are shown in Table 2.

TABLE 2

|  | Example | | | | | | Comp. Example | | |
| --- | --- | --- | --- | --- | --- | --- | --- | --- | --- |
|  | 5 | 6 | 7 | 8 | 9 | 10 | 3 | 4 | 5 |
| PCDE (wt %) | 20 | 20 | 15 | 15 | 20 | 40 | 0 | 0 | 0 |
| TCD (wt %) | 35 | 65 | 30 | 55 | 70 | 40 | 100 | 85 | 0 |
| DCP (wt %) | 45 | 15 | 55 | 30 | 0 | 10 | 0 | 0 | 100 |
| NB (wt %) | 0 | 0 | 0 | 0 | 10 | 10 | 0 | 15 | 0 |
| Yield (wt %) | 70 | 75 | 78 | 68 | 75 | 67 | 60 | 65 | 68 |
| Intrinsic viscosity [$\eta$] (dl/g) | 0.61 | 0.62 | 0.58 | 0.60 | 0.58 | 0.57 |  |  |  |
| PCDE repeating with content in polymer (mol %) | 16 | 17 | 12 | 12 | 16 | 31 | 0 | 0 | 0 |
| TCD repeating unit content in polymer (mol %) | 33 | 64 | 25 | 51 | 67 | 39 | 100 | 77 | 0 |
| DCP repeating unit content in polymer (mol %) | 51 | 19 | 63 | 37 | 0 | 12 | 0 | 0 | 100 |
| NB repeating unit content in polymer | 0 | 0 | 0 | 0 | 17 | 18 | 0 | 23 | 0 |

TABLE 2-continued

|  | Example | | | | | | Comp. Example | | |
| --- | --- | --- | --- | --- | --- | --- | --- | --- | --- |
|  | 5 | 6 | 7 | 8 | 9 | 10 | 3 | 4 | 5 |
| (mol %) | | | | | | | | | |
| Hydrogenation rate (%) | 100 | 100 | 100 | 100 | 100 | 100 | 100 | 100 | 100 |
| Glass transition temperature Tg (°C.) | 133 | 158 | 125 | 145 | 142 | 138 | 163 | 125 | 93 |
| Intrinsic viscosity [η] (dl/g) | 0.59 | 0.63 | 0.59 | 0.57 | 0.60 | 0.59 | 0.59 | 0.63 | 0.68 |
| Light transmittance (%) (1.2 mm thick disk, determined at 830 nm) | 90 | 91 | 91 | 91 | 90 | 92 | 89 | 91 | 91 |
| birefringence (nm) (double pass, determined at 633 nm) | 10–40 | 20–70 | 15–50 | 20–60 | 20–60 | 15–40 | 40–130 | 30–80 | 30–90 |
| Moisture absorption (wt %) (JIS 6911) | 0.1> | 0.1> | 0.1> | 0.1> | 0.1> | 0.1> | 0.1> | 0.1> | 0.1> |
| Solvent resistance (20 hours, room temperature) | | | | | | | | | |
| Ethyl acetate | o | o | o | o | o | o | o | o | o |
| Acetone | o | o | o | o | o | o | o | o | o |
| Chemical resistance (20 hours, room temperature) | | | | | | | | | |
| 28% Aq. ammonia | o | o | o | o | o | o | o | o | o |
| 97.6% sulfuric acid | o | o | o | o | o | o | o | o | o |

Note: The symbol o in the table indicates that no change occurred in appearance.

As is apparent from Table 2, the ring-opening hydrogenated copolymer of the present invention has a Tg in a favorable range of 125° to about 160° C., shows a good birefringence value even in the region of relatively high Tg and is excellent in optical properties. Further, it has high water resistance and chemical resistance and thus is a polymer with well-balanced properties.

Industrial Applicability

The novel ring-opening hydrogenated copolymer of the present invention is excellent in thermal resistance and optical properties and has well-balanced properties including transparency, water resistance, chemical resistance and solvent resistance. Accordingly it can be used in a vast variety of fields including the optical field.

We claim:

1. A polycyclic norbornene or its derivative ring-opening hydrogenated copolymer which comprises a repeating unit represented by the following formula or the alkyl-substituted derivative thereof (A) and a repeating unit represented by the following formula or the alkyl-substituted derivative thereof (B), has an intrinsic viscosity of 0.01–20 dl/g as determined in toluene at 25° C., and in which at least 50% of the (C═══C) linkages constituting the main chain are single bonds

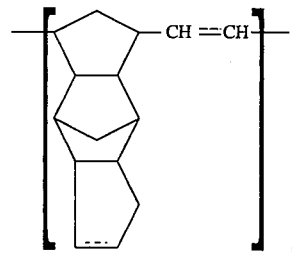

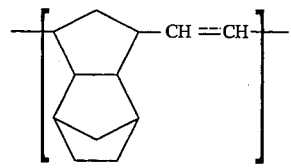

wherein ═══ represents either a single bond or a double bond.

2. A polycyclic norbornene or its derivative ring-opening hydrogenated copolymer according to claim 1 which contains 70–10% by mole of a repeating unit represented by the above formula or the alkyl-substituted derivative thereof (A) and 30–90% by mole of a repeating unit represented by the above formula or the alkyl-substituted derivative thereof (B).

3. A polycyclic norbornene or its derivative ring-opening hydrogenated copolymer according to claim 1 which further contains at least one repeating unit (C) selected from a repeating unit represented by the following formula, the alkyl-substituted derivative thereof, a repeating unit represented by the following formula, the alkyl-substituted derivative thereof, or the alkylidene-substituted derivative thereof

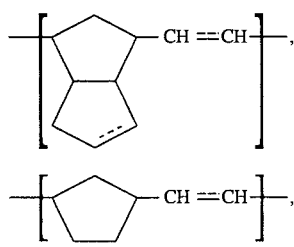

wherein ———— represents either a single bond or a double bond.

4. A polycyclic norbornene or its derivative ring-opening hydrogenated copolymer according to claim 3 which contains 85–5% by mole of a repeating unit represented by the above formula or the alkyl-substituted derivative thereof (A), 10–90% by mole of a repeating unit represented by the above formula or the alkyl-substituted derivative thereof (B) and 5–85% by mole of at least one repeating unit (C) selected from a repeating unit represented by the above formula, the alkyl-substituted derivative thereof, a repeating unit represented by the above formula, the alkyl-substituted derivative thereof, or the alkylidene-substituted derivative thereof.

5. A process for producing a polycyclic norbornene or its derivative ring-opening hydrogenated copolymer wherein at least 50% of the (C———C) linkages constituting the main chain are single bonds which comprises hydrogenating with hydrogen and by use of a hydrogenation catalyst a part or the whole of the olefinic unsaturated groups contained in a polycyclic norbornene or its derivative ring-opening copolymer which contains a repeating unit represented by the following formula or the alkyl-substituted derivative thereof (A') and a repeating unit represented by the following formula or the alkyl-substituted derivative thereof (B'), and has an intrinsic viscosity of 0.01–20 dl/g as determined in toluene at 25° C.

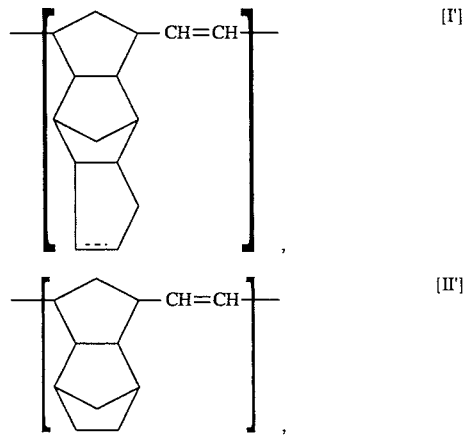

wherein ———— represents either a single bond or a double bond.

6. A process for producing a polycyclic norbornene or its derivative ring-opening hydrogenated copolymer according to claim 5 wherein said copolymer contains 70–10% by mole of a repeating unit represented by the above formula or the alkyl-substituted derivative thereof (A') and 30–90% by mole of a repeating unit represented by the above formula or the alkyl-substituted derivative thereof (B').

7. A process for producing a polycyclic norbornene and/or its derivative ring-opening hydrogenated copolymer according to claim 5 wherein said copolymer further contains at least one repeating unit (C') selected from a repeating unit represented by the following formula, the alkyl-substituted derivative thereof, a repeating unit represented by the following formula, the alkyl-substituted derivative thereof, and the alkylidene-substituted derivative thereof

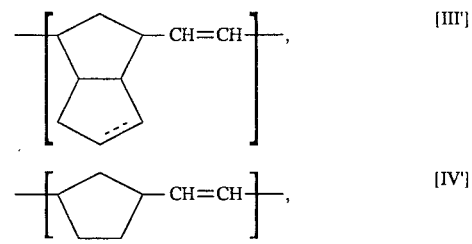

wherein ———— represents either a single bond or a double bond.

8. A process for producing a polycyclic norbornene or its derivative ring-opening hydrogenated copolymer according to claim 7 wherein said copolymer contains 85–5% by mole of a repeating unit represented by the above formula or the alkyl-substituted derivative thereof (A'), 10–90% by mole of a repeating unit represented by the above formula or the alkyl-substituted derivative thereof (B'), and (C) 5–85% by mole of at least one repeating unit (C') selected from a repeating unit represented by the above formula, the alkyl-substituted derivative thereof, a repeating unit represented by the above formula, the alkyl-substituted derivative thereof, or the alkylidene-substituted derivative thereof.

9. The process of claim 5, wherein said polycyclic norbornene or its derivative ring-opening copolymer is polymerized by use of a Ti-based catalyst.

10. The process of claim 6, wherein said copolymer is polymerized by use of a Ti-based catalyst.

11. The process of claim 7, wherein said copolymer is polymerized by use of a Ti-based catalyst.

12. The process of claim 8, wherein said copolymer is polymerized by use of a Ti-based catalyst.

13. The polycyclic norbornene of claim 2, which contains from 60–20 % by mole of said alkyl-substituted derivative (A), and from 40–80 % by mole of said alkyl-substituted derivative (B).

14. The process of claim 6, wherein said polycyclic norbornene contains from 60–20 % by mole of said alkyl-substituted derivative (A'), and from 40–80 % by mole of said alkyl-substituted derivative (B').

15. The polycyclic norbornene of claim 4, which contains from 70–10% by mole of said alkyl-substituted derivative (A), from 20–80% by mole of said alkyl-substituted derivative (B), and from 10–70% by mole of said repeating unit (C).

16. The process of claim 8, wherein said polycyclic norbornene contains from 70–10% by mole of said alkyl-substituted derivative (A'), from 20–80% by mole of said alkyl-substituted derivative (B'), and from 10–70% by mole of said repeating unit (C').

17. The polycyclic norbornene of claim 1, wherein at least 80% of the double bonds in the polymer are hydrogenated and the intrinsic viscosity of the polymer is 0.1–10 dl/g.

18. The polycyclic norbornene of claim 17, wherein at least 90% of the double bonds in the polymer are hydrogenated.

19. The process of claim 5, wherein at least 80% of the double bonds of said polycyclic norbornene are hydrogenated and the intrinsic viscosity of the polymer is 0.1–10 dl/g.

20. The process of claim 19, wherein said at least 90% of the double bonds in the polymer are hydrogenated.

21. The polycyclic norbornene of claim 1, wherein a $T_g$ for said polymer is about 110° C. to about 190° C.

22. The polycyclic norbornene of claim 21, wherein a $T_g$ for said polymer is about 170° C. to about 180° C.

23. The polycyclic norbornene of claim 3, wherein a $T_g$ for said polymer is about 120° to 160° C.

* * * * *